June 21, 1966  G. SLAYTER  3,256,912
PIPE INSULATION
Original Filed Dec. 7, 1959  2 Sheets-Sheet 1
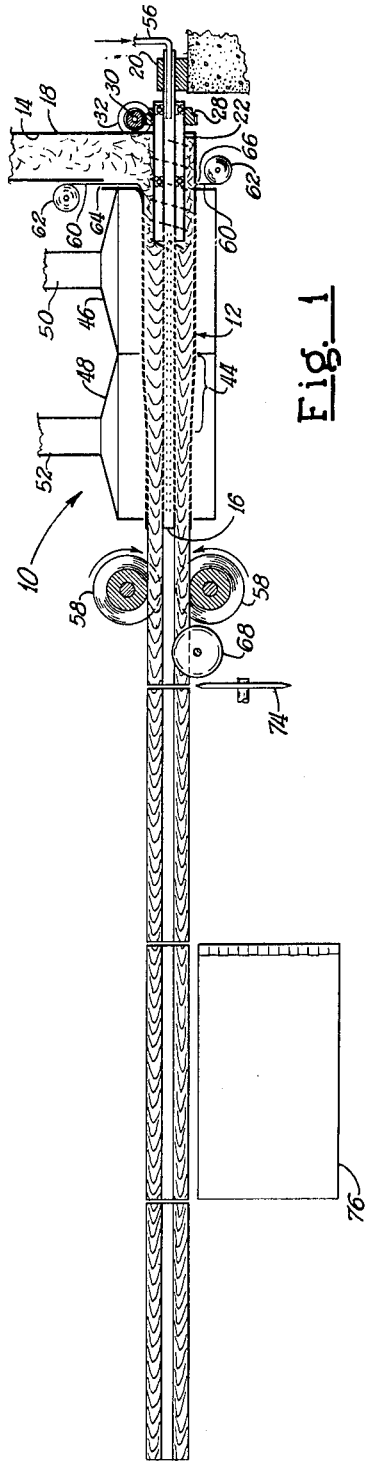
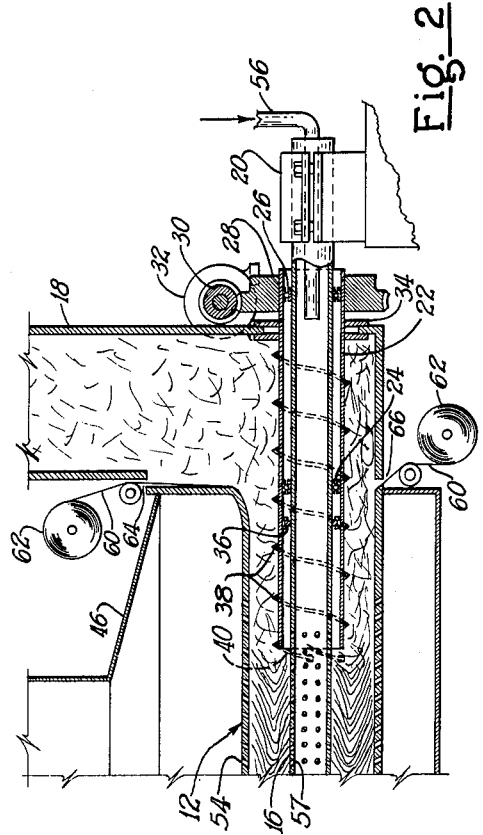
INVENTOR.
GAMES SLAYTER
BY
ATTORNEYS

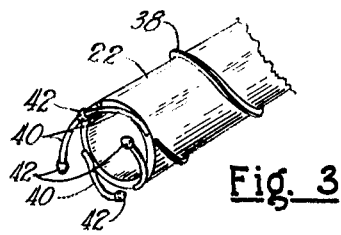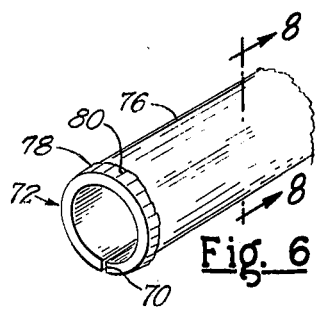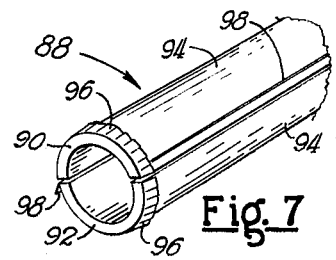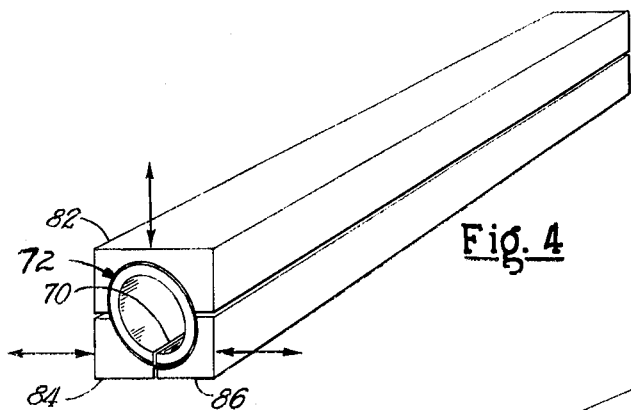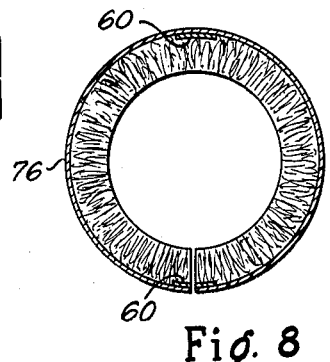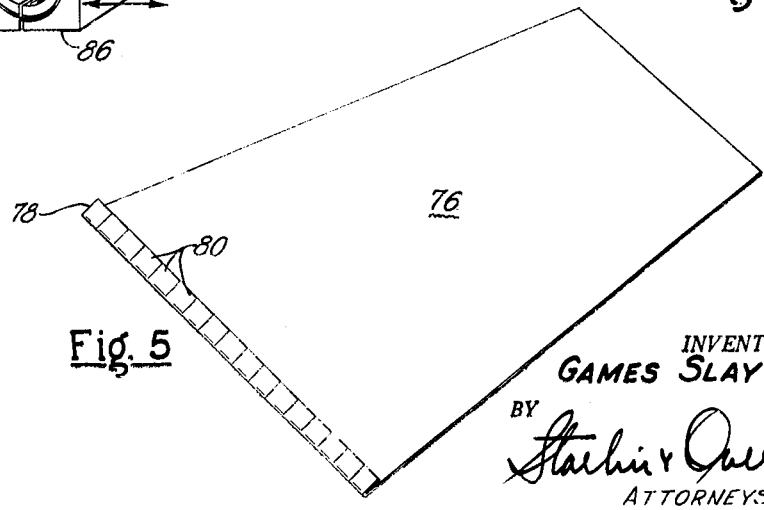

United States Patent Office 3,256,912
Patented June 21, 1966

3,256,912
PIPE INSULATION
Games Slayter, Newark, Ohio, assignor to Owens-Corning Fiberglas Corporation, a corporation of Delaware
Original application Dec. 7, 1959, Ser. No. 857,653, now Patent No. 3,147,165, dated Sept. 1, 1964. Divided and this application Aug. 6, 1964, Ser. No. 387,944
4 Claims. (Cl. 138—118)

This application is a division of my co-pending application, Ser. No. 857,653, filed Dec. 7, 1959, now Patent No. 3,147,165.

This invention relates to improved pipe insulation and to the manufacture of such insulation.

Pipe insulation of glass fibers or similar insulating fibrous material has found wide commercial acceptance because of the many advantages obtained. A common method of making sections of such pipe insulation includes forming the sections in semi-cylindrical halves in individual molds. Coated fibers are placed in the molds which are then closed to compact the fibers generally longitudinally of the mold in the desired shape. Heat is then applied to cure the coating to bond the fibers in integral masses. This method of making pipe insulation sections is relatively slow because a considerable amount of handling is necessary to place the fibrous material in the molds in the proper manner, to open and close the molds, and to remove the cured sections from the molds. In addition, each mold can produce only a limited amount of pipe sections because the fibrous material must be left in the mold for a period of time to cure the coating.

More recently, a method for making pipe insulation continuously has been proposed which requires fewer handling operations and provides relatively rapid production. Basically, this method comprises supplying coated fibers to one end of an annular chamber and moving the fibrous mass through the chamber while curing a coating on the fibers so that the fibrous mass will be formed into integral pipe insulation when it emerges from the opposite end of the chamber. The resulting insulating tube is then spirally wrapped with a suitable covering, slit longitudinally, and cut into sections. While this method is rapid, it has one principal disadvantage. When the fibrous mass is pushed through the chamber, the fibers, unless cut to very minute lengths, are compacted and oriented in planes perpendicular to the longitudinal axis of the insulation. While such insulation has good strength in compression, it is relatively weak in bending, in shear, and in axial tension.

In accordance with the present invention, fibrous pipe insulation is provided in which the fibers are disposed in annular, generally V-shaped orientations and are nested with tips of the V's directed toward a common end of the insulation. This type of orientation of the fibers is achieved by subjecting the fibers to a concentrated force in a circular path which has a diameter greater than that of the inner surface of the insulation and less than that of the outer surface. The fibers are pushed forwardly in this manner so as to be generally disposed at an angle to the inner and outer surfaces, toward the direction in which the insulation is moved. This type of orientation establishes much greater strength in flexing, shear, and tension because the fibers are intertwined and bonded together more fully in a direction longitudinally of the insulation.

The new method of and apparatus for manufacturing this insulation also includes other improvements as more fully brought out below.

It is therefore, a principal object of the invention to provide improved pipe insulation and manufacture of same.

Another object of the invention is to provide pipe insulation of a bonded fibrous material with the fibers angularly disposed to the surfaces thereof, and a method of making same.

Still another object of the invention is to provide a fibrous, tubular body in which fibers are disposed in V-shape configurations, with the tips of the V's nested and pointing toward a common end of the pipe.

A further object of the invention is to provide improved apparatus for making pipe insulation.

Other objects and advantages of the invention will be apparent from the following detailed description of a preferred embodiment thereof, reference being made to the accompanying drawing, in which:

FIG. 1 is a schematic view in cross section of apparatus for producing pipe insulation in accordance with the principles of the invention;

FIG. 2 is a detailed, fragmentary view in cross section of the apparatus shown in FIG. 1;

FIG. 3 is a detailed perspective view of a portion of a conveyor employed with the apparatus shown in FIGS. 1 and 2;

FIG. 4 is a perspective view of a portion of the apparatus shown in FIG. 1, for applying a covering to a section of the pipe insulation;

FIG. 5 is a perspective view of a covering used to protect the pipe insulation;

FIG. 6 is a perspective view of a portion of a completed pipe insulation section;

FIG. 7 is a perspective view of a portion of a completed modified pipe insulation section; and FIG. 8 is an enlarged view in transverse cross section taken along the line 8—8 of FIG. 6.

While the pipe insulation discussed below is specifically made with glass fibers because of their high insulating effectiveness, other fibers also can be employed. Glass fibers used in the pipe insulation can be made by a number of well-known fiber-forming processes, such as the steam-blown process illustrated in Slayter Patent No. 2,206,059. The fibers preferably have diameters between 0.00020" and 0.00060" and are coated with a suitable binder, preferably thermal setting, which can be subsequently cured to bond the fibers together as an integral mass. Phenol-formaldehyde and urea-formaldehyde have been found suitable for this purpose. The coating can be partially cured before the coated fibers are supplied to the insulation-forming apparatus to render the fibers somewhat tacky and to reduce subsequent curing time. Depending on the fiber-forming process employed, the resulting fibers will have lengths up to six inches but can be cut to shorter lengths prior to being supplied to the apparatus for forming the pipe insulation, if desired.

Referring to the drawings, and more particularly to FIG. 1, apparatus for continuously producing pipe insulation is designated 10 and includes a cylindrical mold 12 to one end of which fibers are supplied from a passage 14. A mandrel 16 is centrally located longitudinally of the mold 12 and forms an annular chamber with the mold 12. The mandrel 16 extends through a rear wall 18 of the passage 14 and is held by a suitable supporting block 20. The other end of the mandrel 16 can extend through the mold 12 far enough that it will be supported by the cured insulation, or can extend well beyond the mold 12 and be held by a separate support, with the insulation being removed from the mandrel in sections before reaching the support.

A screw-type conveyor 22 is rotatably mounted on the mandrel 16 by means of bearings 24 and 26 (FIG. 2) and extends through the rear wall 18 where it is driven by any suitable means such as a worm wheel 28, a worm 30, and a motor 32. A gas-tight seal 34 prevents leakage between the conveyor 22 and the rear wall 18, and a second gas-tight seal 36 prevents leakage between the conveyor 22 and the mandrel 16. A beveled strip or heavy wire 38 is wrapped helically around the conveyor 22 to carry the fibers into the mold 12.

When the fibers reach the end of the conveyor 22, a portion of them are pushed forwardly and compacted against previously densified fibers by means of a force applied by arcuate fingers 40 preferably made of resilient spring steel or the like, which fingers extend outwardly from the end of the conveyor 22 and rotate therewith. A plurality of tips 42 are attached to the outer ends of these fingers to spread the force slightly over the fibers. The tips 42 move in a circular path over an annular area having a minimum diameter gerater than that of the mandrel 16, and a maximum diameter less than that of the mold 12. The portions of the fibers near the circular path of the fingers 40 are pushed forwardly to a greater extent than the ends away from the path so that the fibers are disposed in a generally V-shape configuration with the tips directed toward the forward end of the pipe insulation. The majority of the fibers are also disposed at angles of more than 0° and less than 90° to the inner and outer surfaces of the insulation. The insulation can be laterally compacted by tapering the mold 12 slightly as at 44 which compresses the fibers radially inwardly and narrows the V-shape configuration further to improve the strength of the insulation in tension, shear, and flexing.

The resin binder of the insulation is cured by the time it emerges from the annular chamber formed by the mold 12 and the mandrel 16 by application of heat. This can be accomplished, for example, with the aid of two plenum chambers 46 and 48 to which hot air under pressure is supplied through ducts 50 and 52, the heated air passing through holes 54 (FIG. 2) in the mold 12 and into the insulation. The holes 54 are preferably located obliquely in the mold 12 in the direction toward which the insulation moves so that the air helps to move the insulation along the mold, as it moves at relatively high velocity through the holes 54 and strikes the outer surface of the insulation, and also tends to act as an air bearing as a portion of it travels between the mold 12 and the insulation, thereby to help separate them. The hot air also tends to cure the resinous coating on the fibers at the surface of the insulation more quickly, thus helping to prevent these outer fibers from sticking to the mold 12. If desired, additional hot air can be supplied through a pipe 56 to the interior of the mandrel 16 and passed through oblique holes 57 into the insulation. This air also helps to move the insulation forwardly along the mandrel and assists in curing more quickly the resinous coating on the fibers at the inner surface of the mass. The introduction of air at the interior assists in maintaining a separation between the fibers and the mandrel and also prevents the inner fibers from adhering to it. Although some of the hot air passes between the insulation and both the mold 12 and the mandrel 16, much of it passes through the insulation and is exhausted beyond the second plenum chamber 48.

Other arrangements can be used to cure the resinous coating with hot air. For example, air can be exhausted from the mandrel 16 so as to cause a greater flow laterally through the insulation from the plenum chambers 46 and 48 to the mandrel.

The cured insulation can be pulled by driven rollers 58 beyond the plenum chamber 48. However, most of the motivating force applied to the insulation must be such as to place it in compression to prevent tearing or parting thereof. To impart greater tensile strength to the tubular mass of insulation, narrow tapes or reinforcing means 60 (see FIG. 8 also) can be applied to its outer surfaces during forming. The tapes or reinforcing member 60 are supplied from rollers 62 through slots 64 and 66 and are pulled along the mold 12 with the insulation and form a part thereof but are not visible in the final product because of a covering applied thereto. Because the tapes or reinforcing members 60 are narrow, they do not appreciably inhibit flow of heated air through the holes 54, which are located all around the mold 12. As an alternative to the use of reinforcing tapes, wires can be employed to provide additional tensile strength during forming, which wires can be removed from the insulation at a point just beyond the rollers 58 and returned to the forward end of the mold 12 for re-use. The wires thereby simply act as endless belts.

As the cured insulation moves past the rollers 58, it is slit longitudnally by a circular saw blade 68 (FIG. 1) to provide a longitudinal slot 70 (FIGS. 6 and 8) extending through the insulation from the inner surface to the outer surface. The insulation is also cut into lengths or sections 72 by a traveling saw blade 74 (FIG. 1) to form pieces which can be easily handled and shipped. The tubular insulation is installed on a pipe merely by spreading the mass at the slot 70 and pushing the length of insulation over the pipe in a generally axial direction.

After the insulation is cut into the sections 72, it is preferably given a heavy covering of a suitable sheet material which may be adhered to the outer surface thereof. In the preferred form the covering 76 is provided with a cuff extension 78 at one end, the extensions being formed with a plurality of slits 80 therealong which enable the cuff 78 to be turned over, after installation, of the section 72 on a pipe, and adhered to an end of an adjacent pipe section. This forms a complete and continuous cover over the length of the pipe over which the sections 72 are placed.

The protective covering 76 can be applied to the sections 72 in any suitable manner as by means of three shoes 82, 84, and 86 (FIG. 4). The covering 76 is placed into the upper, semi-cylindrical shoe 82 which presses it around the upper half of the section 72, the inner exposed face of the covering having been coated with a suitable adhesive. The lower shoes 84 and 86 then move horizontally inwardly to press the covering 76 on the lower part of the section 72 with the edges of the covering adjacent the slit 70. If desired, one of the longitudinal edges of the covering 76 adjacent the slit 70 can have a flap therealong which can be overlapped and adhered to the other edge of the covering after it is installed on a pipe.

If desired, the insulation can be slit along two diametrically opposite lines to provide a pipe section 88 (FIG. 7) comprising an upper half 90 and a lower half 92. Each of these halves is provided with a covering 94 having a cuff 96 at one end which is similar to the segmented cuff 78 and in addition each covering has a flap 98 along a side edge. When the two halves 90 and 92 are placed around a pipe, each of the flaps 98 is turned over and adhered to the covering of the contiguous half to form a complete covering around the periphery of the insulation. The halves have the advantage that they can be nested together and thus save shipping space and costs.

Numerous modifications of the above described embodiment of the invention will be apparent to those skilled in the art. It is to be understood that such modifications will be within the scope of the invention if within the spirit of the appended claims.

I claim:
1. An elongated tubular body of fibrous material with the fibers being arranged in nesting relationship in V-shape configuration with the tips of the V's being directed toward a common end of the body, a binder holding the fibers in the predetermined positions, a covering of sheet material around said body and having a segmented cuff at one end thereof, and a plurality of reinforcements extending longitudinally of said body and affixed thereto.

2. An elongated body comprising fibers and a binder holding the fibers in predetermined positions, said body having a lateral cross section in the shape of at least part of a circle, said body having a length several times its major cross-sectional dimension, a substantial number of the fibers lying at substantially common angles to the inner surface of said body, with ends located at the inner surface, and the other ends disposed toward a common end of said body, and at least a substantial number of the remainder of the fibers lying at substantially common angles to the outer surface of said body, with ends located at the outer surface and the other ends disposed toward the same end of said body as the first fibers, a covering of sheet material around the outer surface of said body, and a plurality of reinforcements extending longitudinally of said body and affixed thereto.

3. An elongated body according to claim 2 characterized by said covering having a segmented cuff extending beyond one end thereof.

4. An elongated body comprising fibers and a binder holding the fibers in predetermined positions, said body having a lateral cross section in the shape of at least one-half of a circle, said body having a length several times its major cross-sectional dimension, a substantial number of the fibers of said body being arranged in nesting relationship in V-shape configuration with the tips of the V's being directed toward a common end of the body, some of said fibers lying at substantially common angles to the inner surface of said body, with ends of the fibers being located at the inner surface, and at least a substantial portion of the remainder of the fibers lying at substantially common angles to the outer surface of said body, with ends of the substantial portion being located at the outer surface of said body.

References Cited by the Examiner

UNITED STATES PATENTS

| | | | |
|---|---|---|---|
| 1,317,957 | 10/1919 | Carroll | 138—141 |
| 1,860,203 | 5/1932 | Rishel | 138—141 |
| 1,895,420 | 1/1933 | Mottweiler | 138—141 |
| 1,977,515 | 10/1934 | Klippel. | |
| 2,016,039 | 10/1935 | Hurrell | 138—141 |
| 2,188,373 | 1/1940 | Pearce | 161—153 |
| 2,288,095 | 6/1942 | Lindsay et al. | 264—121 |
| 2,718,664 | 9/1955 | Schweitzer. | |
| 2,897,874 | 8/1959 | Stalego et al. | 156—62.2 X |
| 2,980,144 | 4/1961 | Edwards et al. | 138—109 |
| 3,054,428 | 9/1962 | Crawford | 138—141 |
| 3,093,532 | 6/1963 | Miller et al. | 156—430 |

LAVERNE D. GEIGER, *Primary Examiner.*

LEWIS J. LENNY, *Examiner.*